United States Patent
Tilmans et al.

(10) Patent No.: US 12,206,591 B2
(45) Date of Patent: Jan. 21, 2025

(54) MANAGING DATA TRAFFIC CONGESTION IN NETWORK NODES

(71) Applicant: Nokia Solutions and Networks Oy, Espoo (FI)

(72) Inventors: Olivier Tilmans, Rixensart (BE); Koen De Schepper, Boortmeerbeek (BE)

(73) Assignee: Nokia Solutions and Networks Oy, Espoo (FI)

(*) Notice: Subject to any disclaimer, the term of this patent is extended or adjusted under 35 U.S.C. 154(b) by 52 days.

(21) Appl. No.: 18/313,873

(22) Filed: May 8, 2023

(65) Prior Publication Data
US 2023/0362099 A1  Nov. 9, 2023

(30) Foreign Application Priority Data

May 9, 2022 (EP) .................................. 22172415

(51) Int. Cl.
*H04L 47/28* (2022.01)
*H04L 47/12* (2022.01)
*H04L 47/56* (2022.01)

(52) U.S. Cl.
CPC .............. *H04L 47/28* (2013.01); *H04L 47/12* (2013.01); *H04L 47/56* (2013.01)

(58) Field of Classification Search
CPC ......... H04L 47/28; H04L 47/12; H04L 47/56; H04L 47/127; H04L 47/2441; H04L 47/24; H04L 47/32; H04L 47/629
(Continued)

(56) References Cited

U.S. PATENT DOCUMENTS

| 2017/0019343 A1* | 1/2017 | De Schepper | .......... H04L 47/31 |
| 2020/0021532 A1* | 1/2020 | Borikar | .................... H04L 47/28 |

(Continued)

FOREIGN PATENT DOCUMENTS

| EP | 3340551 A1 | 6/2018 |
| EP | 4007225 A1 | 6/2022 |
| WO | 2017/009715 A1 | 1/2017 |

OTHER PUBLICATIONS

De Schepper et al., "PI2: A Linearized AQM for both Classic and Scalable TCP", Proceedings of the 12th International on Conference on emerging Networking Experiments and Technologies, Dec. 2016, pp. 105-119.

(Continued)

*Primary Examiner* — Karen C Tang
(74) *Attorney, Agent, or Firm* — Nokia Solutions and Networks Oy

(57) ABSTRACT

Example embodiments describe a method for managing data traffic congestion in a network communication node. The method comprising maintaining a marking probability based on a marking ratio indicative of a change in packets responsible for congestion in a network queue in the network communication node over a change in a total number of packets processed by the network queue. The method further comprising classifying packets processed by the network queue as scalable packets or other packets based on an identifier included in the packets; wherein the scalable packets support scalable congestion control. The method further comprising marking the scalable packets responsible for congestion in the network queue with a congestion mark to signal data traffic congestion; and marking the other packets that support unscalable congestion control with the congestion mark based on the marking probability.

14 Claims, 8 Drawing Sheets

(58) Field of Classification Search
USPC .................................................. 709/238
See application file for complete search history.

(56) References Cited

U.S. PATENT DOCUMENTS

2022/0150171 A1* 5/2022 Matthews ............... H04L 47/20
2022/0167206 A1* 5/2022 Tilmans .................. H04L 47/32

OTHER PUBLICATIONS

McKenney, "Stochastic Fairness Queuing", Proceedings. IEEE INFOCOM '90: Ninth Annual Joint Conference of the IEEE Computer and Communications Societies@m_The Multiple Facets of Integration, Jun. 3-7, 1990, pp. 733-740.

Joergensen et al., "The Flow Queue CoDel Packet Scheduler and Active Queue Management Algorithm", RFC 8290, Internet Engineering Task Force (IETF), Jan. 2018, pp. 1-25.

Briscoe, "Tunnelling of Explicit Congestion Notification", RFC 6040, Internet Engineering Task Force (IETF), Nov. 2020, pp. 1-35.

Kent et al., "Security Architecture for the Internet Protocol", RFC 4301, Network Working Group, Dec. 2005, pp. 1-101.

Briscoe, "Propagating Explicit Congestion Notification Across IP Tunnel Headers Separated by a Shim", draft-ietf-tsvwg-rfc6040update-shim-16, Transport Area Working Group, Mar. 2023, 19 pages.

De Schepper et al., "Identifying Modified Explicit Congestion Notification (ECN) Semantics for Ultra-Low Queuing Delay", draft-ietf-tsvwg-ecn-l4s-id-01, Transport Services, Internet-Draft, Oct. 30, 2017, pp. 1-32.

Briscoe et al., "Low Latency, Low Loss, Scalable Throughput (L4S) Internet Service: Architecture", draft-ietf-tsvwg-l4s-arch-00, Transport Area Working Group, Internet-Draft, May 5, 2017, pp. 1-31.

De Schepper et al., "Dual-Queue Coupled Active Queue Management (AQM) for Low Latency, Low Loss, and Scalable Throughput (L4S)", RFC 9332, Internet Engineering Task Force (IETF), Jan. 2023, pp. 1-53.

Extended European Search Report received for corresponding European Patent Application No. 22172415.6, dated Sep. 2, 2022, 7 pages.

Notice of Allowance received for corresponding European Patent Application No. 22172415.6, dated Aug. 26, 2024, 7 pages.

* cited by examiner

MANAGING DATA TRAFFIC CONGESTION IN NETWORK NODES

CROSS-REFERENCE TO RELATED APPLICATIONS

This application claims priority to European Patent Application No. 22172415.6 filed May 9, 2022, the entire contents of which are incorporated herein by reference.

TECHNICAL FIELD

Various example embodiments relate to managing data traffic congestion in a network queue of a network communication node.

BACKGROUND

In some nodes of a communication network, data packets are buffered in a queue before being forwarded to a next node. This results in a queuing delay. These nodes can experience traffic congestion when the rate of packets received exceeds the rate the node can handle. Active Queue Management, AQM, can manage congestion and reduce the queuing delay by marking packets upon detecting or predicting congestion. The marked packets can trigger a congestion control response in a sender that results in an adjustment of the packet transmission rate.

In traditional or unscalable congestion control a multiplicative reduction of the packet transmission rate is applied. As such, the queuing delay and utilization in the node can vary substantially when the traffic flow rate changes.

In scalable congestion control the packet transmission rate is reduced proportionally to the amount of received marked packets. This results in low latency communication because the queuing delay is limited even when the traffic flow rate scales as the average time from one congestion signal to the next remains invariant. The transition from unscalable to scalable congestion control will occur gradually, as it requires substantial adaptations to the senders, the nodes, and the receivers.

SUMMARY

The scope of protection sought for various embodiments of the invention is set out by the claims. The example embodiments and features described in this specification that do not fall within the scope of the claims, if any, are to be interpreted as examples useful for understanding various embodiments of the invention.

Amongst others, it is an object of embodiments of the invention to provide a solution for managing data traffic congestion in a network communication node.

This object is achieved, according to a first example aspect of the present disclosure, by a method of managing data traffic congestion in a network communication node. The method comprises maintaining a marking probability based on a marking ratio indicative of a change in a number of packets processed by a network queue and responsible for congestion in the network queue in the network communication node over a change in a total number of the packets processed by the network queue, wherein those of the packets responsible for congestion cause a congestion parameter to exceed a threshold. The method further comprises classifying the packets processed by the network queue as scalable ones of the packets or other of the packets based on the identifier included in the packets. The method further comprises marking the scalable ones of the packets responsible for congestion in the network queue with a congestion mark to signal data traffic congestion; and marking the other of the packets that support unscalable congestion control with the congestion mark based on the marking probability.

Thus, scalable packets responsible for congestion are immediately marked with the congestion mark. The other packets that support unscalable congestion control are marked with a smoothed signal according to the marking probability based on the marking ratio. The marking probability allows to determine whether an other packet should be marked to signal data traffic congestion. The marking ratio is indicative of a marking density that would be applied to packets in a scalable traffic queue reserved for scalable packets, i.e. a queue without other packets. In other words, the marking density that is applied to scalable packets for scalable congestion control is converted to a marking density for unscalable congestion control that is applied to the other traffic. By this coupling of the respective marking densities for scalable packets and other packets, fairness can be achieved in a single queue, i.e. network resources can be fairly distributed between the scalable packets and other packets in a shared queue.

The marking density for the scalable packets and for the other packets are determined by identifying or tracking packets responsible for congestion in the network queue, i.e. packets that cause a congestion parameter such as the queuing delay or the queue size to exceed a certain value. This allows to determine the marking densities without substantial convergence time, e.g. compared to a proportional integral, PI, control loop. By the marking, the scalable and unscalable congestion controls in various senders can track the capacity of the network communication node. This allows to maintain a low queue size, and thus, a low queuing delay regardless of the packet type.

It is an advantage that the marking can reduce jitter and that starvation of the network queue can be avoided. It is a further advantage that a network queue can be shared between scalable packets and other packets without affecting latency, allowing other traffic to benefit from the low latency communication provided by scalable traffic queues without latency penalties. It is a further advantage that the method is compatible with existing transport protocols that support scalable congestion control, e.g. the data centre transmission control protocol, DCTCP, or QUIC, and existing transport protocols that support unscalable congestion control, e.g. the transmission control protocol, TCP. It is a further advantage that the method is compatible with existing scalable congestion controls, e.g. BBRv2, Prague, SCReAM, and unscalable congestion controls, e.g. New Reno and CUBIC.

According to an example embodiment, the maintaining can further comprise identifying those of the packets as responsible for congestion in the network queue before enqueuing the packets in the network queue.

The change in packets responsible for congestion can thus be updated or determined before adding the packet to the network queue, e.g. before segmentation. The network communication node can additionally update the change in total number of packets processed by the network queue, maintain the marking probability, classify the packets processed by the network queue, and/or perform the marking before enqueuing the packet in the network queue. This allows to implement the method in network communication nodes that aggregate the received packets upon enqueuing, or in network communication nodes with an inaccessible network queue, e.g. a queue that resides in an inaccessible circuitry such as a system on chip, SOC.

According to a further example embodiment, the maintaining can further comprise identifying those of the packets as responsible for congestion in the network queue upon dequeuing the packets from the network queue.

The change in packets responsible for congestion can thus be updated or determined upon dequeuing the packet from the network queue, e.g. before serialization. The network communication node can additionally update the change in total number of packets processed by the network queue, maintain the marking probability, classify the packets processed by the network queue, and/or perform the marking upon dequeuing the packet from the network queue. This allows to implement the method in software applications, e.g. in a queuing discipline, qdisc, of a Linux network interface.

According to a further example embodiment, those of the packets can be identified as responsible for congestion in the network queue in response to a size of the network queue exceeding a size threshold.

The size threshold represents a maximum allowable size of the network queue, e.g. a maximum amount of packets or a maximum amount of data that can be present in a queue without resulting in congestion. A packet received by the network communication node can thus be identified as responsible for congestion if enqueuing that packet results in a queue size that exceeds the size threshold.

According to a further example embodiment, those of the packets can be identified as responsible for congestion in the network queue in response to a sojourn time of the packets in the network queue exceeding a time threshold.

The sojourn time of a packet can be indicative of the time needed for the packet to travel through the network queue, i.e. the difference between the enqueue time and the dequeue time of the packet. The sojourn time can be measured, e.g. upon dequeuing a packet, or can be estimated, e.g. based on the size of a packet and the bit rate of the network communication node upon enqueuing the packet. The time threshold represents a maximum allowable sojourn time of a packet without resulting in congestion of the network queue. A packet forwarded or outputted by the network communication node can thus be identified as responsible for congestion if the sojourn time of the packet exceeds the time threshold upon dequeuing the packet. This has the further advantage that the method can be independent of the rate at which packets are received by the network communication node, i.e. the serving rate, and/or variations in the serving rate.

According to a further example embodiment, the method can further comprise, before enqueuing the packets in the network queue, flagging the scalable ones of the packets for marking and flagging the other of the packets for marking based on the marking probability; and, upon dequeuing, performing the marking with the congestion mark for those of the packets that are flagged for marking and are identified as responsible for congestion in the network queue.

Packets received by the network communication node can thus first be classified as scalable packets or other packets. The classified packets can then be flagged for marking, e.g. by adding an identifier, stamp, or flag according to their classification or packet type before enqueuing the packets in the network queue. All scalable packets receive a flag, while the other packets are flagged according to the maintained marking probability. Upon dequeuing, the packet can then be checked for the presence of the flag in addition to identifying whether the packet is responsible for congestion. This allows to reduce the performed operations, the execution time, and the consumed processing power of the method in the dequeue pipeline. This further allows to implement the method in network communication nodes with a high throughput or low serialization time per packet, i.e. with a limited available time budget in the dequeue pipeline for marking.

According to a further example embodiment, the method can further comprise dropping a number of the packets in response to a size of the network queue exceeding a first drop threshold, or in response to a sojourn time of the packets in the network queue exceeding a second drop threshold.

Dropping a packet refers to substantially removing or discarding the packet from memory. This results in packet loss as received packets may not be enqueued in the network queue or dequeued packets may not be forwarded or transmitted by the network communication node. Marked packets and/or unmarked packets can be considered for dropping. The first drop threshold can preferably be larger than the size threshold. The second drop threshold can preferably be larger than the time threshold. This can make the network queue more resilient against sudden changes in queuing delay, e.g. due to a plurality of traffic flows starting up, unresponsive traffic flows, or a sudden burst of packets.

According to a further example embodiment, the method can further comprise dropping the other of the packets that are eligible for marking based on the marking probability and that do not support unscalable congestion control.

Other packets can thus support unscalable congestion control or not. This can, for example, be determined from the identifier included in the packets. Unscalable congestion control can, for example, not be supported if the sender of the packet is not provided with a congestion control algorithm, or if the traffic transport protocol of the packet does not support marking the packet with the congestion mark. This further allows to manage the congestion in the network queue in the presence of other packets that do not support congestion control. It is a further advantage that futile marking of packets that do not support scalable congestion control is avoided.

According to a further example embodiment, the congestion mark and the identifier are included in an explicit congestion notification, ECN, field of an internet protocol, IP, header of the packets.

The identifier in the ECN field can for example have a distinct value, e.g. predetermined bits, to indicate a scalable packet, an other packet supporting unscalable congestion control, or an other packet not supporting unscalable congestion control.

According to a further example embodiment, the marking can further comprise overwriting the identifier included in the explicit congestion notification, ECN, field with the congestion mark.

In other words, the value or bits included in the ECN field of the IP header can be switched or adjusted to a predetermined value to mark the packet with the congestion mark.

According to a further example embodiment, the maintaining of the marking probability comprises updating the marking probability and the marking ratio at a predetermined time interval, or at a predetermined change in the total number of packets processed by the network queue.

In other words, the marking probability is based on the change in packets responsible for congestion and the change in the total number of packets processed by the network queue during a predetermined interval. This allows to periodically derive or calculate the marking probability rather than for every packet processed by the queue. This has the further advantage that it can limit the execution time and the consumed processing power of the method.

According to a further example embodiment, the marking probability is based on a moving average of the marking ratio.

The moving average can for example, amongst others, be a simple moving average, a cumulative average, a weighted moving average, an exponential moving average, or any other moving average known to the skilled person.

According to a second example aspect, an apparatus comprising a network communication node to manage data traffic congestion is disclosed. The network communication node is configured to maintain a marking probability based on a marking ratio indicative of a change in a number of packets processed by a network queue and responsible for congestion in the network queue in the network communication node over a change in a total number of the packets processed by the network queue, wherein those of the packets responsible for congestion cause a congestion parameter to exceed a threshold. The network communication node is further configured to classify the packets processed by the network queue as scalable ones of the packets or other of the packets based on an identifier included in the packets, the scalable packets supporting scalable congestion control. The network communication node is further configured to mark the scalable ones of the packets responsible for congestion in the network queue with a congestion mark to signal data traffic congestion; and mark the other of the packets that support unscalable congestion control with the congestion mark based on the marking probability.

According to a third example aspect, a non-transitory computer readable storage medium is disclosed comprising computer-executable instructions for performing the following steps when the instructions are executed on a computer:
  maintaining a marking probability based on a marking ratio indicative of a change in a number of packets processed by a network queue and responsible for congestion in the network queue in a network communication node over a change in a total number of the packets processed by the network queue, wherein those of the packets responsible for congestion are causing a congestion parameter to exceed a threshold;
  classifying the packets processed by the network queue as scalable ones of the packets or other of the packets based on an identifier included in the packets, the scalable ones of the packets supporting scalable congestion control;
  marking the scalable ones of the packets responsible for congestion in the network queue with a congestion mark to signal data traffic congestion; and
  marking the other of the packets that support unscalable congestion control with the congestion mark based on the marking probability.

BRIEF DESCRIPTION OF THE DRAWINGS

Some example embodiments will now be described with reference to the accompanying drawings.

DETAILED DESCRIPTION OF EMBODIMENT(S)

Figure 1:
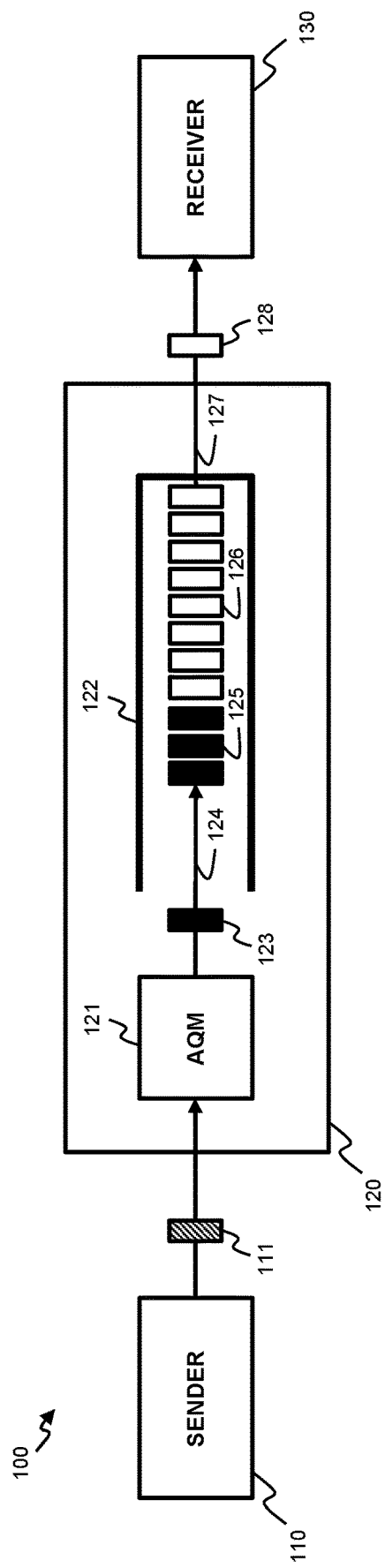
FIG. 1 shows an example traffic flow of data packets in selected components of a communication network.

FIG. 1 shows an example traffic flow of data packets in selected components of a communication network 100. A traffic flow can be understood as a collection of data packets 111, 123, 125, 126, 128 that are sent from a sender 110, i.e. a source node, to a receiver 130, i.e. a destination node. The communication network 100 can include one or more senders 110 that transmit data as packets 111, 123, 125, 126, 128 to a destination node, i.e. receiver 130. The data packets 111, 123, 125, 126, 128 can comprise information such as, for example, emails, voice calls, or streaming video. The sender 110 can for example, amongst others, be a server or router device. The receiver 130 can for example be a laptop, a smartphone, a tablet, or any other destination node in a communication network known to the skilled person. The packets 111, 123, 125, 126, 128 travel through one or more intermediate network nodes such as network communication node 120. Network communication node 120 receives the transmitted packets 111 and forwards the packets 128 on the next leg of their journey, i.e. towards the intended receiver 130.

The network communication node 120 can for example, amongst others, be a router or a switch that has input and output ports coupled to a physical transmission medium, e.g. an optical fibre, a coax cable, a copper wire, or an air interface. The network communication node 120 can further comprise one or more network queues 122 for enqueuing 124 and dequeuing 127 packets 123, 128 at the ports to control the reception and transmission of packets 123, 128 on an established communication link.

The communication network 100 can experience data traffic congestion when the rate of sent packets 111, i.e. the amount of packets 111 sent by sender 110 in a certain time interval, exceed what the network communication node 120 can handle. This results in a build-up of excess packets 125 in the network communication node 120 as packets have to wait in the network queue 122 before being forwarded to the receiver 130. Therefore, the network communication node 120 can be configured to manage or control data traffic congestion in the communications network 100, typically referred to as active queue management, AQM.

To this end, an AQM module 121 in the network communication node 120 selectively drops or marks packets 111, 123, 125, 126, 128 under certain conditions to control congestion. In particular, the AQM module 121 can apply marks to packets when congestion is detected and/or predicted, i.e. when queue 122 is overflowing or is about to overflow and, thus, that the excess packets 125 are experiencing or about to experience excessive queueing delays. The receivers 130 can be configured to reflect these applied marks, i.e. congestion signals, back to the respective sender 110 of the packet. Based on the received marks, a congestion control algorithm can then adjust the packet transmission rate of the sender 110 to avoid congestion and the resulting network issues such as, for example, packet loss, retransmission, high latency, and/or jitter.

Traditional congestion control algorithms, also referred to as classic or unscalable congestion control, apply a multiplicative reduction of the packet transmission rate for every marked packet that is reflected to the sender 110, e.g. halve the transmission rate for every marked packet. By this multiplicative reduction, the utilization and queueing delay in the network queue will vary substantially when traffic flow rates increase. Unscalable congestion control algorithms can include, for example, Tahoe, Reno, New Reno, Vegas, Hybla, binary increase congestion control, BIC, CUBIC, bottleneck bandwidth and round-trip propagation time, BBR, or any other unscalable congestion control algorithm known to the skilled person. Packets sent according to a protocol that supports unscalable congestion control, e.g. transmission control protocol, TCP, can be referred to as unscalable packets.

Scalable congestion control algorithms apply a reduction of the packet transmission rate proportionally to the amount of reflected marked packets. In scalable congestion control, the average time from one congestion signal to the next, i.e. the recovery time, remains invariant as the flow rate scales. As scalable congestion control allows senders 110 to closely track the link capacity of the network communication node and reduce the queuing delay, low latency communication with limited jitter can be achieved. Scalable congestion control can include, amongst others, BBRv2, Prague, and SCReaM. Packets sent according to a protocol that supports scalable congestion control, e.g. data centre transmission control protocol, DCTCP, or QUIC, can be referred to as scalable packets.

Because of the difference in packet transmission rate adjustment at the sender 110, the unscalable packets and the scalable packets require a different marking strategy, i.e. a different marking density. As unscalable and scalable packets coexist in communication networks 100, it can be desirable to provide network communication node 120 with an AQM that is compatible with both packet types.

Figure 2:
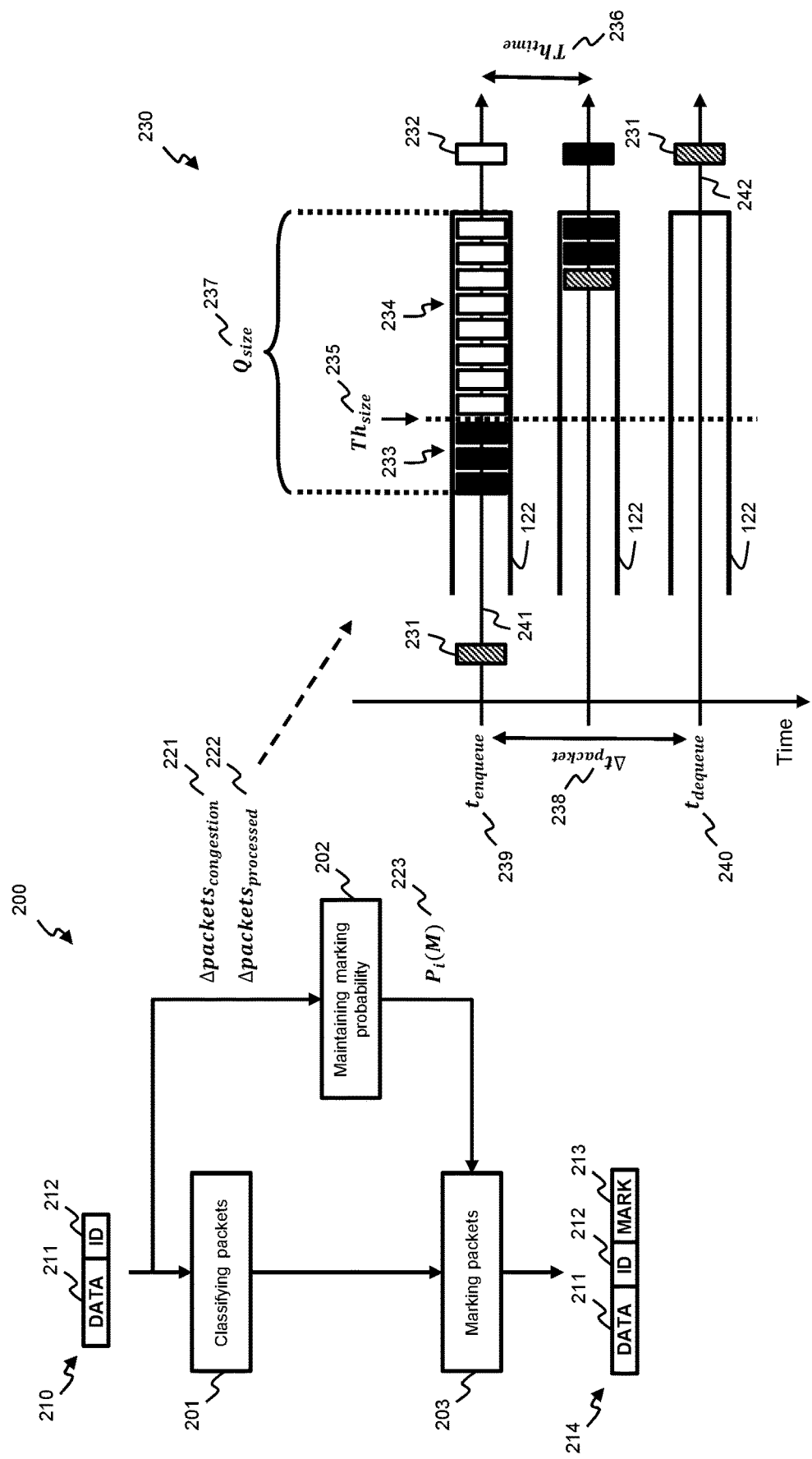
FIG. 2 shows steps of the method for managing data traffic congestion in a network communication node according to example embodiments.

FIG. 2 shows steps 200 according to an example embodiment for managing data traffic congestion in the network communication node of FIG. 1 that is compatible with scalable packets and unscalable packets.

In a first step 201, a packet 210 processed by the network queue is classified as a scalable packet or as an other packet. A processed packet can refer to a packet 231 that is received by the network communication node but not yet enqueued in the network queue 122, e.g. before packet segmentation. Alternatively, a processed packet can also refer to a packet 232 that is dequeued from the network queue but not yet transmitted or forwarded to the respective receiver, e.g. before packet serialization. Network queue 122 may further be a real network queue or a virtual network queue.

The classifying in step 201 is based on an identifier 212 that is included in the processed packet 210 in addition to data 211, e.g. a message, a document, or a video stream. The identifier 212 can, for example, be added to the packet by the sender or by the congestion control algorithm of the sender. The identifier 212 can be included in an explicit congestion notification, ECN, field of an internet protocol, IP, header of the packet 210. Such an identifier 212 in the ECN field can have a distinct value, e.g. predetermined bits, to indicate a scalable packet, an other packet supporting unscalable congestion control, or an other packet not supporting unscalable congestion control. For example, the ECN field can contain identifier bits 0b01 to indicate a scalable packet, 0b10 to indicate an other packet supporting unscalable congestion control, and 0b00 to indicate an other packet not supporting unscalable congestion control.

In a second step 202, a marking probability 223 is maintained based on a marking ratio. The marking probability allows to determine whether an other packet should be used to signal data traffic congestion, i.e. if the packet should be marked. The marking ratio is derived as the ratio between the change in packets responsible for congestion $\Delta packets_{congestion}$ 221 and the change in total number of packets processed by the network queue $\Delta packets_{processed}$ 222, i.e.

$$\frac{\Delta packets_{congestion}}{\Delta packets_{processed}}.$$

The change in total number of packets processed by the network queue $\Delta packets_{processed}$ 222 can for example be tracked by updating a counter when a packet 231 is enqueued 241 in the network queue 122 or dequeued 242 from the network queue 122. The change in packets responsible for congestion $\Delta packets_{congestion}$ 221 can for example be tracked by updating a counter when a packet 233 is identified as responsible for congestion in the network queue 122. A packet responsible for congestion 233 can refer to a packet that causes a congestion parameter, e.g. the queuing delay 238 or the queue size 237, to exceed a threshold 235, 236.

According to an example embodiment, identifying packets 230 as responsible for congestion in the network queue can be performed before enqueuing 241 the packet in the network queue 122. As such, packets can be identified as responsible for congestion when a size 237 of the network queue exceeds a size threshold 235. For example, the build-up of excess packets 233 in the network queue 122 can be identified as packets responsible for congestion. The size threshold 235 represents a maximum allowable size of the network queue, i.e. a maximum amount of packets 234 or a maximum amount of data that can be present in the queue without resulting in congestion. The size threshold 235 can for example be 1500 B at a bit rate of 12 Mbps. A packet 231 received by the network communication node can thus be identified as responsible for congestion when enqueuing 241 that packet results in a queue size 237 that exceeds the size threshold 235. This allows implementation in network communication nodes that aggregate the received packets 231 upon enqueuing 241, or in network communication nodes with an inaccessible network queue 122, e.g. a queue that resides in an inaccessible circuitry such as a closed or protected system on chip, SOC.

According to an alternative example embodiment, identifying packets 230 as responsible for congestion in the network queue can be performed upon dequeuing 242 the packet 231 from the network queue 122. As such, a packet can be identified as responsible for congestion when a sojourn time 238 exceeds a time threshold 236. For example, the build-up of excess packets 233 in the network queue 122 can be identified as packets responsible for congestion. The sojourn time 238 of a packet 231 is indicative of the time needed for the packet to travel through the network queue 122, i.e. the difference between the enqueue time 239 and the dequeue time 240 of the packet 231. This difference, i.e. the sojourn time 238, can for example be measured upon dequeuing 242 the packet 231. The time threshold 236 represents a maximum allowable sojourn time of a packet without resulting in congestion of the network queue 122. The time threshold 236 can for example be 1 ms. A packet forwarded or outputted by the network communication node can thus be identified as responsible for congestion when the sojourn time 238 of the packet 231 exceeds the time threshold 236 upon dequeuing 242 the packet. This allows to implement the method in software applications, e.g. in a queuing discipline, qdisc, of a Linux network interface. This has the further advantage that the method can be independent of the rate at which packets are received by the network communication node, i.e. the serving rate, and/or variations in the serving rate.

It will be apparent that the congestion parameter in the example embodiments described above is interchangeable as the sojourn time 238 can be converted to a queue size 237, and vice-versa, based on the bit rate of the network communication node. In other words, packets responsible for congestion 233 can also be identified based on the sojourn time 238 before enqueuing 241 the packet, and packets responsible for congestion 233 can also be identified based on the queue size 237 upon dequeuing 242 the packet. It will further be apparent that the maintaining of the marking probability 223 in step 202 and the identifying 230 of packets responsible for congestion in the network queue can be performed substantially before the classifying in step 201, substantially after the classifying in step 201, or substantially simultaneous with the classifying in step 201, i.e. in parallel.

The marking probability 223 can be based on a moving average of the marking ratio. The moving average can for example, be a simple moving average, a cumulative average, a weighted moving average, an exponential moving average, or any other moving average known to the skilled person. Such a moving average of the marking ratio at step i may, for example, be determined as $$S_i = ewma\left(S_{i-1}, \frac{\Delta packets_{congestion}}{\Delta packets_{processed}}\right) \quad (1)$$

wherein $S_{i-1}$ represents the moving average of the marking ratio at a previous step i−1 and $$ewma\left(S_{i-1}, \frac{\Delta packets_{congestion}}{\Delta packets_{processed}}\right)$$

represents the exponentially weighted moving average determined by, for example:

$$ewma\left(S_{i-1}, \frac{\Delta packets_{congestion}}{\Delta packets_{processed}}\right) = \alpha * \frac{\Delta packets_{congestion}}{\Delta packets_{processed}} + (1-\alpha)*S_{i-1} \quad (2)$$

wherein α is a weight factor between zero and one.

The marking probability 223 can, for example, be a value between zero and one. Preferably, the maintaining of the marking probability can be performed at a predetermined time interval, e.g. every 30 ms, or at a predetermined change in the total number of packets 222 processed by the network queue, e.g. every 30 packets at a bit rate of 12 Mbps. In other words, the marking probability 223 is based on the change in packets responsible for congestion 221 and the change in the total number of packets processed by the network queue 222 during a predetermined interval. This allows to periodically derive or update the marking probability 223 rather than for every packet processed by the queue. This has the further advantage that it can limit the execution time and the consumed processing power of the method. The marking probability can, for example, be determined as $$P_i(M) = \left(\frac{S_i}{2}\right)^2 \quad (3)$$

wherein $P_i(M)$ and $S_i$ represent the current marking probability and the moving average of the marking ratio at step i, respectively.

In a following step 203, the classified packets are marked with a congestion mark 213 to signal congestion to the respective senders. Packets classified as scalable packets are marked with the congestion mark 213 when identified 230 as responsible for congestion. Packets classified as other packets are marked with the congestion mark 213 based on the marking probability 223 if they support unscalable congestion control. In other words, other packets that do not support unscalable congestion control may not be marked. Other packets can, for example, be marked when the marking probability $P_i(M)$ 223 is equal to, or larger than a random value, e.g. when $P_i(M) \geq r$ and(0,1). In doing so, senders that implement an unscalable congestion control algorithm receive a smoothed congestion signal, i.e. a frequency of reflected marked packets 214, compatible with their packet transmission rate adjustment mechanism.

This smoothed congestion signal for unscalable congestion control is thus coupled to the congestion signal for scalable congestion control by the marking probability 223, which is based on the marking ratio. This marking ratio is indicative of the marking density that would be applied to packets in a scalable traffic queue reserved for scalable packets, i.e. a queue without other packets. In other words, the marking density that is applied to scalable packets for scalable congestion control is converted or translated to a marking density for unscalable congestion control that is applied to the other traffic. By this coupling of the respective marking densities for scalable packets and other packets, fairness can be achieved in the single queue 122, i.e. network resources can be fairly distributed between the scalable packets and other packets in a shared queue.

Marking a packet can comprise adding the congestion mark 213 to the packet. Alternatively, marking a packet can comprise overwriting or adjusting the identifier 212 included in the packet 210. According to an embodiment, the marking can preferably comprise overwriting an identifier 212 included in the explicit congestion notification, ECN, field of an internet protocol, IP, header of the packet 210 with the congestion mark 213. In other words, the value or bits included in the ECN field of the IP header can be switched or adjusted to a predetermined value, e.g. to 0b11, to mark the packet 210 with the congestion mark 213.

A packet 210 received by a network communication node can further already include a congestion mark that was applied by the AQM-module of a preceding network communication node. For example, the ECN field of a received packet can already contain the congestion mark 0b11. As this prevents the classifying of the packet as scalable or as an other packet, such a packet can preferably be treated as a scalable packet.

By the marking in step 203, the scalable and unscalable congestion controls in different senders can closely track the capacity of the network communication node. This allows to maintain a low queue size 237, and thus, a low queuing delay 238 regardless of the packet type, i.e. scalable packets or unscalable packets. The marking density for packets in the network queue 122 are thus directly determined by identifying or tracking packets responsible for congestion in the network queue, i.e. by leveraging a threshold-based mechanism. This allows to determine the marking densities without substantial convergence time, e.g. compared to a proportional integral, PI, control loop.

It is an advantage that the marking can reduce jitter and that starvation of the network queue 122 can be avoided. It is a further advantage that a network queue 122 can be shared between scalable traffic and other traffic without affecting latency, allowing other traffic to benefit from the low latency communication provided by scalable traffic queues without latency penalties. An example of such a scalable traffic queue can be a queue according to the low latency, low loss, scalable throughput, L4S, framework of the Internet Engineering Task Force, IETF.

It is a further advantage that the method is compatible with existing transport protocols that support scalable congestion control, e.g. data centre transmission control protocol, DCTCP, or QUIC, and existing transport protocols that support unscalable congestion control, e.g. transmission control protocol, TCP. It is a further advantage that the method is compatible with existing scalable congestion controls, e.g. BBRv2, Prague, SCReAM, and unscalable congestion controls, e.g. New Reno and CUBIC.

Figure 3A:
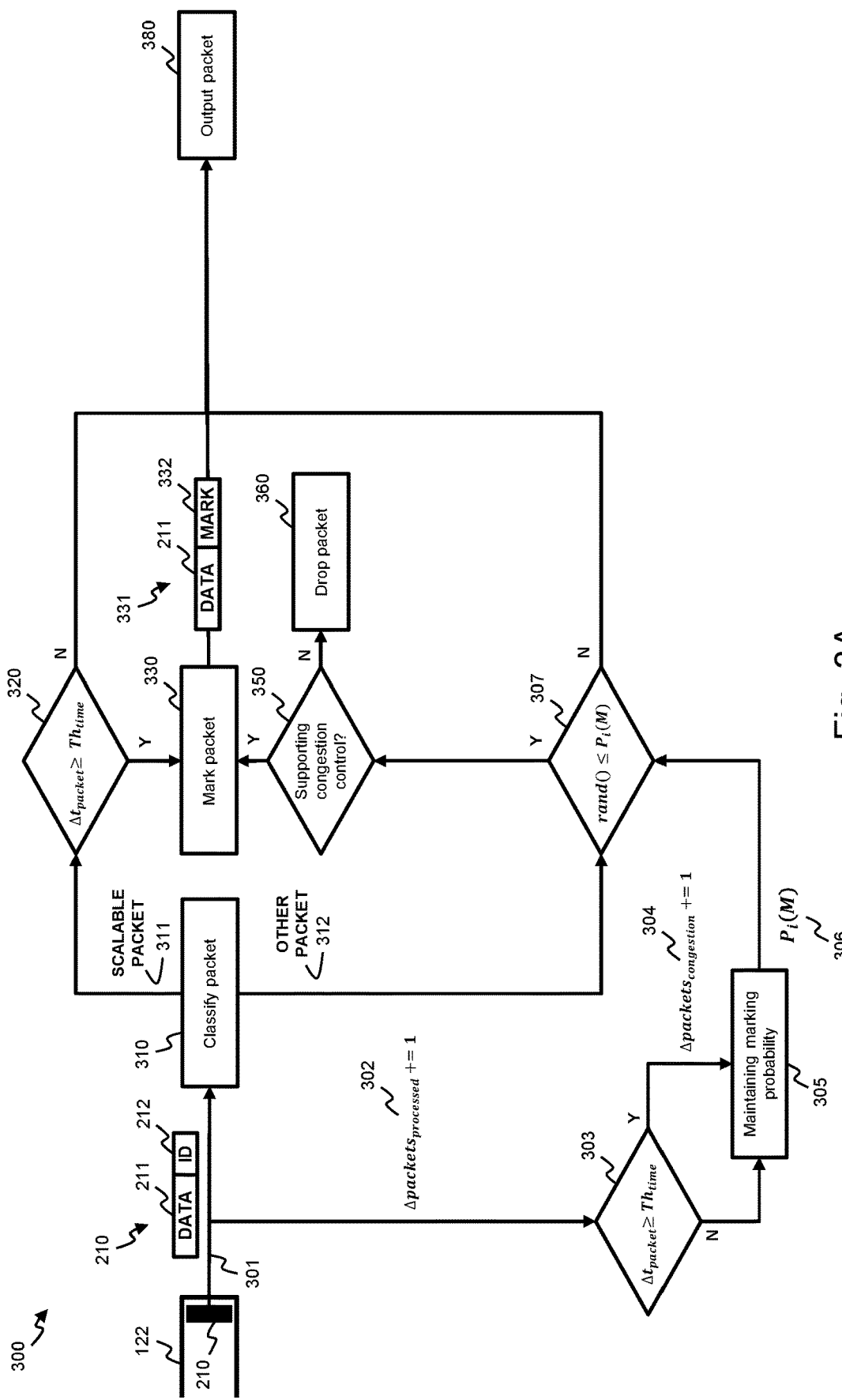
FIG. 3A shows steps of the method for managing data traffic congestion performed upon dequeuing a packet from the network queue according to example embodiments.

FIG. 3A shows steps 300 according to an example embodiment wherein the steps of the method are performed upon dequeuing 301 a packet 210 from the network queue 122. Upon dequeuing 301 the packet 210, the change in total number of packets processed by the network queue $\Delta packets_{processed}$ 302 can be updated, e.g. by incrementing a counter by one. In a following step 303, the dequeued packet 210 can be identified as responsible for congestion if the sojourn time $\Delta t_{packet}$ of the packet 210 exceeds the time threshold $Th_{time}$. If this is the case, the change in packets responsible for congestion $\Delta packets_{congestion}$ can be updated 304, e.g. by incrementing a counter by one. Else, the method can continue to step 305 without updating $\Delta packets_{congestion}$. In step 305, the marking probability 306 can be maintained or updated as described in relation to FIG. 2 above.

The dequeued packet 210 can further be classified as a scalable packet 311 or an other packet 312 in step 310. The classifying can be performed as described in relation to FIG. 2 above. The classifying in step 310 can be performed substantially after or substantially simultaneous with the identifying of packets responsible for congestion in step 303 and the maintaining of the marking probability in step 305.

In a following step 320, scalable packets 311 can be identified as responsible for congestion in the network queue 122 if the sojourn time $\Delta t_{packet}$ of the packet 210 exceeds the time threshold $Th_{time}$. If this is the case, the scalable packet 311 is marked in step 330, e.g. by overwriting identifier 212 with the congestion mark 332. Else, the packet 210 is outputted in step 380 without marking it. Alternatively, in step 320, scalable packets 311 can be identified as responsible for congestion in the network queue 122 based on a first time threshold $Th_{t1}$ and a second time threshold $Th_{t2}$, wherein the second may be substantially larger than the first, i.e. $Th_{t1}<Th_{t2}$. For example, scalable packets 311 with a sojourn time $\Delta t_{packet}$ substantially smaller than the first time threshold, i.e. $\Delta t_{packet}<Th_{t1}$, may not be identified as responsible for congestion; packets with a sojourn time that exceeds the second time threshold, i.e. $Th_{t2}<\Delta t_{packet}$, may always be identified as responsible for congestion; and packets with a sojourn time between the first time threshold and the second time threshold, i.e. $Th_{t1} \leq \Delta t_{packet} \leq Th_{t2}$, may be identified as responsible for congestion according to a probability function based on the actual sojourn time of the packet, e.g. a progressive probability to identify the packet as responsible for congestion between the first $Th_{t1}$ and second $Th_{t2}$ time threshold.

When the packet 210 is classified as an other packet 312, the maintained or updated marking probability 306 is used to determine whether the packet 210 is eligible for marking. If, in step 307, the marking probability 306 is larger or equal to a random value, e.g. between zero and one, the packet 210 is eligible for marking and the method proceeds to step 350. Else, the packet 210 is outputted in step 380 without marking it.

The other packet 312 can be marked in step 330 when the other packet eligible for marking supports unscalable congestion control. This can, for example, be determined in step 350 based on the identifier 212 included in the packet 210. Unscalable congestion control can, for example, not be supported when the sender of the packet 210 is not provided with a congestion control algorithm, or when the traffic transport protocol of the packet 210 does not support marking the packet with the congestion mark 332. If the packet eligible for marking in step 350 does not support unscalable congestion control, the other packet 312 can be dropped in step 360. Dropping a packet refers to substantially removing or discarding the packet from memory. This results in packet loss as the packet is not outputted, i.e. forwarded or transmitted, by the network communication node. This allows to manage the congestion in the network queue 122 in the presence of other packets 312 that do not support congestion control. It is a further advantage that futile marking of packets that do not support scalable congestion control can be avoided.

It will further be apparent that identifying a packet as responsible for congestion in the network queue in steps 303 and 320 can be performed only once. In a final step 380, the marked scalable or other packet 331 can be forwarded or outputted by the network communication node.

Figure 3B:
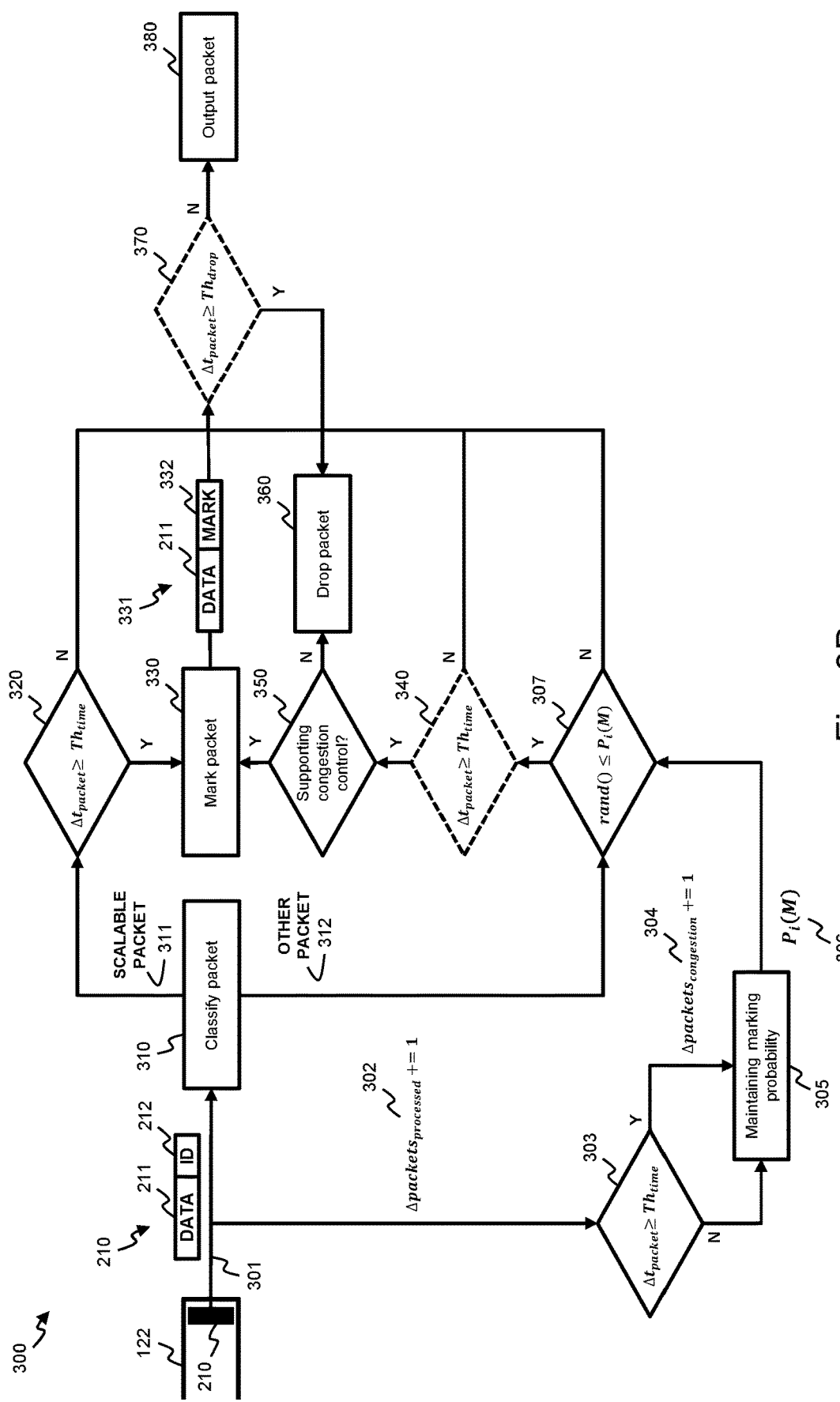
FIG. 3B shows further steps of the method for managing data traffic congestion performed upon dequeuing a packet from the network queue according to further example embodiments.

FIG. 3B shows additional steps 340, 370 according to a further example embodiment wherein the steps 300 of the method are performed upon dequeuing 301 a packet 210 from the network queue 122.

If the marking probability 306 is larger or equal than a random value in step 307, the other packet 312 can further be identified as responsible for congestion in the network queue 122. This can be achieved by comparing the sojourn time $\Delta t_{packet}$ of the packet 210 with the time threshold $Th_{time}$ in additional step 340. If the packet is identified as responsible for congestion, the method proceeds to step 350 and continues as described above in relation to FIG. 3A. Else, the method proceeds to additional step 370. Alternatively, step 370 can be skipped and the method proceeds directly to step 380.

In step 370, the sojourn time $\Delta t_{packet}$ of a packet can further be compared to a first drop threshold $Th_{drop}$. The packet can be a marked packet 331 originating from step 330, or an unmarked packet originating from step 320, 330, or 340. Drop threshold $Th_{drop}$ can preferably be substantially larger than the time threshold $Th_{time}$, e.g. a drop threshold of 1.5 ms when the time threshold is 1 ms. If the sojourn time $\Delta t_{packet}$ of the packet exceeds the first drop threshold $Th_{drop}$, the packet can be dropped in step 360. In other words, additional step 370 provides an overload protection to the network queue 122. This can make the network queue 122 more resilient against sudden changes in queuing delay, e.g. due to a plurality of traffic flows starting up, unresponsive traffic flows, or a sudden burst of packets. It will be apparent that additional step 370 need not be performed at the end of the method, step 370 can for example also be performed before step 310.

Figure 4A:
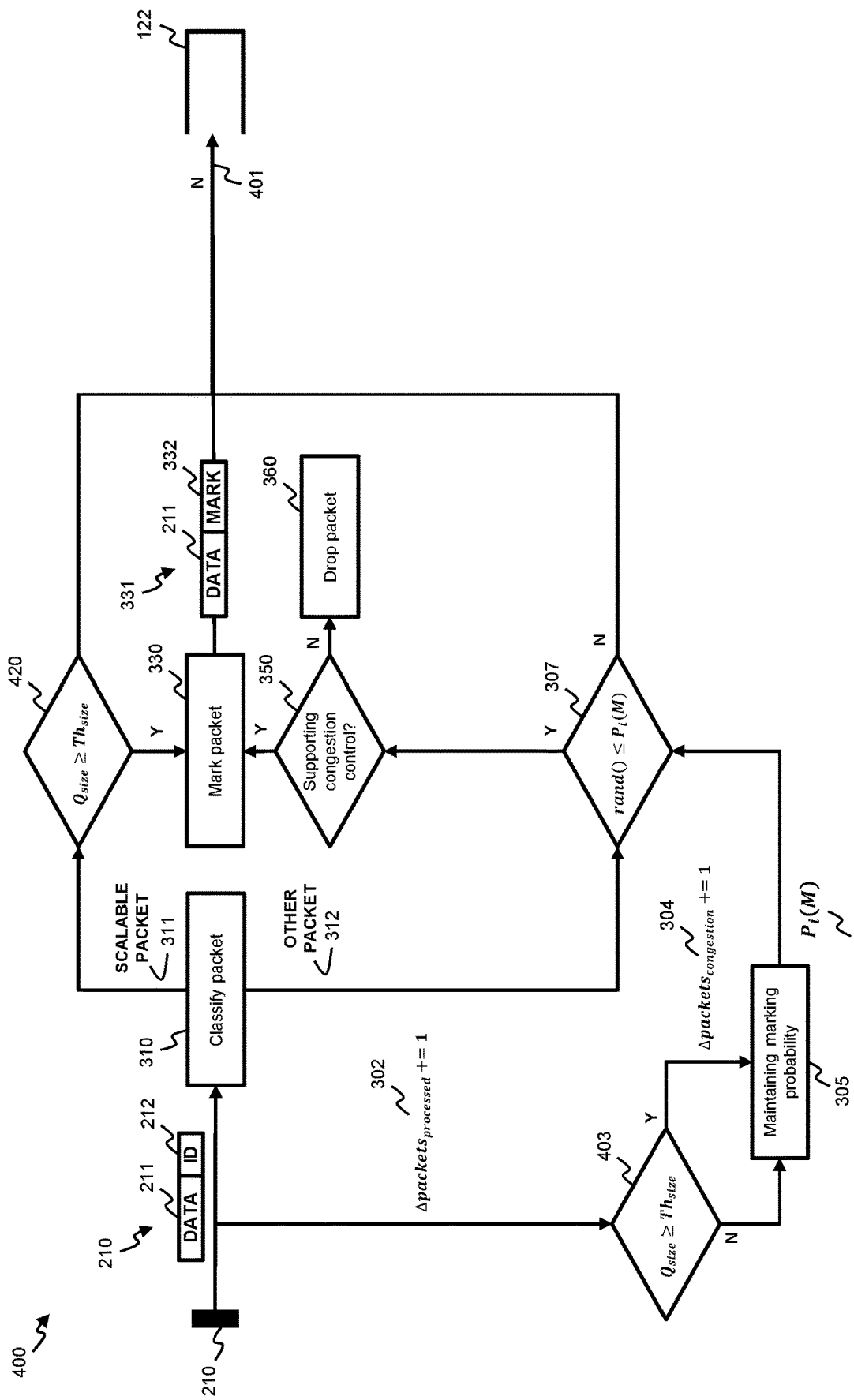
FIG. 4A shows steps of the method for managing data traffic congestion performed before enqueuing a packet in the network queue according to example embodiments.

FIG. 4A shows steps 400 according to an example embodiment wherein the steps of the method are performed before enqueuing 401 a packet 210 received by a network communication node in the network queue 122. Before enqueuing 401 the packet 210, e.g. before segmentation, the change in total number of packets processed by the network queue $\Delta packets_{processed}$ 302 can be updated, e.g. by incrementing a counter by one. In a following step 403 the received packet 210 can be identified as responsible for congestion if enqueuing 401 packet 210 results in a queue size $Q_{size}$ of the network queue 122 that exceeds the size threshold $Th_{size}$. If this is the case, the change in packets responsible for congestion $\Delta packets_{congestion}$ can be updated 304, e.g. by incrementing a counter by one. Else, the method can continue to step 305 without updating $\Delta packets_{congestion}$. In step 305, the marking probability 306 can be maintained or updated as described in relation to FIG. 2 above.

The received packet 210 can further be classified as a scalable packet 311 or an other packet 312 in step 310. The classifying can be performed as discussed in relation to FIG. 2 above. The classifying in step 310 can be performed substantially after or substantially simultaneous with identifying packets responsible for congestion in step 303 and maintaining of the marking probability in step 305.

In a following step 420, a scalable packet 311 can be identified as responsible for congestion in the network queue 122 when enqueuing 401 packet 210 results in a queue size $Q_{size}$ of the network queue 122 that exceeds the size threshold $Th_{size}$. If this is the case, the scalable packet 311 is marked in step 330, e.g. by overwriting identifier 212 with the congestion mark 332. Alternatively, in step 420, scalable packets 311 can be identified as responsible for congestion in the network queue 122 based on a first size threshold $Th_{s1}$ and a second size threshold $Th_{s2}$, wherein the second may be substantially larger than the first, i.e. $Th_{s1} < Th_{s2}$. For example, if the queue size $Q_{size}$ is substantially smaller than the first size threshold, i.e. $Q_{size} < Th_{s1}$, the scalable packet 311 may not be identified as responsible for congestion; if the queue size $Q_{size}$ exceeds the second size threshold, i.e. $Th_{s2} < Q_{size}$, the scalable packet 311 may always be identified as responsible for congestion; and if the queue size $Q_{size}$ is between the first size threshold and the second size threshold, i.e. $Th_{s1} \leq Q_{size} \leq Th_{s2}$, the scalable packet 311 may be identified as responsible for congestion according to a probability function based on the actual queue size $Q_{size}$, e.g. a progressive probability to identify the packet as responsible for congestion between the first $Th_{s1}$ and second $Th_{s2}$ time threshold.

When the packet 210 is classified as an other packet 312, the maintained or updated marking probability 306 is used to determine whether the packet 210 is eligible for marking. If, in step 307, the marking probability 306 is larger or equal to a random value, e.g. between zero and one, the packet 210 is eligible for marking and the method proceeds to step 350. Else, the packet 210 is enqueued 401 without marking it.

The other packet 312 can be marked in step 330 when the other packet eligible for marking supports unscalable congestion control. This can, for example, be determined in step 350 based on the identifier 212 included in the packet 210. Unscalable congestion control can, for example, not be supported when the sender of the packet 210 is not provided with a congestion control algorithm, or when the traffic transport protocol of the packet 210 does not support marking the packet with the congestion mark 332. If the packet eligible for marking in step 350 does not support unscalable congestion control, the other packet 312 can be dropped in step 360. Dropping a packet refers to substantially removing or discarding the packet from memory. This results in packet loss as the packet is not enqueued in the network queue 122. This allows to manage the congestion in the network queue 122 in the presence of other packets 312 that do not support congestion control. It is a further advantage that futile marking of packets that do not support scalable congestion control can be avoided.

It will further be apparent that identifying a packet as responsible for congestion in the network queue in steps 403 and 420 can be performed only once. In a final step, the marked packet 331 can be enqueued 401 in network queue 122 of the network communication node i.e. added to network queue 122.

Figure 4B:
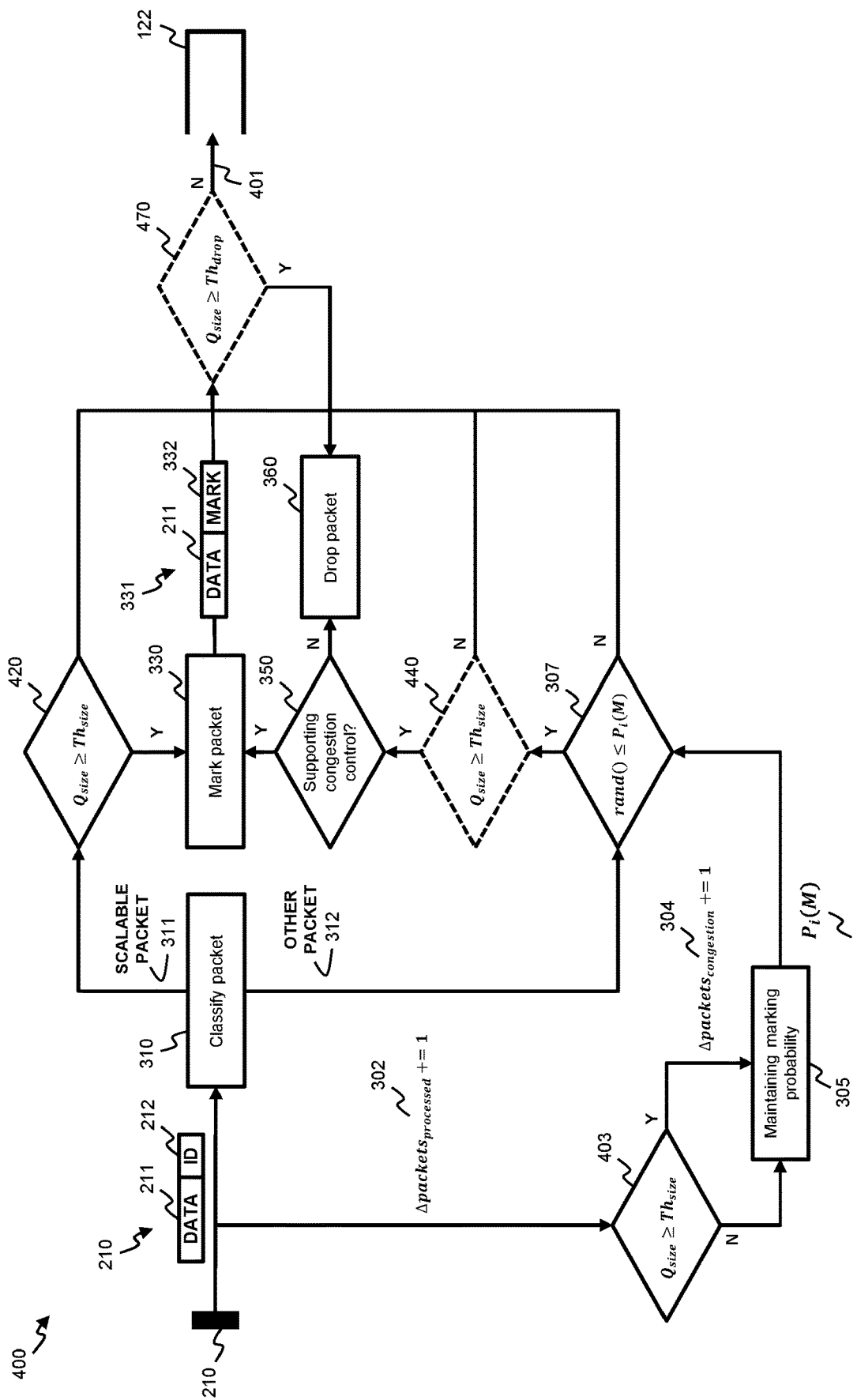
FIG. 4B shows further steps of the method for managing data traffic congestion performed before enqueuing a packet from the network queue according to further example embodiments.

FIG. 4B shows additional steps 440, 470 according to a further example embodiment wherein the steps 400 of the method are performed before enqueuing 401 a packet 210 in the network queue 122.

If the marking probability 306 is equal to or larger than a random value in step 307, the other packet 312 can further be identified as responsible for congestion in the network queue 122. This can be achieved by comparing the queue size $Q_{size}$ of the network queue 122 with the size threshold $Th_{size}$ in additional step 440. If the packet is identified as responsible for congestion, the method proceeds to step 350 and continues as described above in relation to FIG. 4A. Else, the method proceeds to additional step 470. Alternatively, step 470 can be skipped and the method proceeds by enqueuing 401 the packet.

In step 470, the queue size $Q_{size}$ of the network queue 122 can further be compared to a second drop threshold $Th_{drop}$. The packet can be a marked packet 331 originating from step 330, or an unmarked packet originating from step 320, 330, or 340. Drop threshold $Th_{drop}$ can preferably be substantially larger than the size threshold $Th_{size}$, e.g. a drop threshold of 2.25 MB when the size threshold is 1.5 MB. If the queue size $Q_{size}$ of the network queue 122 exceeds the second drop threshold $Th_{drop}$, the packet can be dropped in step 360. In other words, additional step 470 provides an overload protection to the network queue 122. This can make the network queue 122 more resilient against sudden changes in queuing delay, e.g. due to a plurality of traffic flows starting up, unresponsive traffic flows, or a sudden burst of packets. It will be apparent that additional step 470 need not be performed at the end of the method, step 470 can for example also be performed before step 310.

Figure 5:
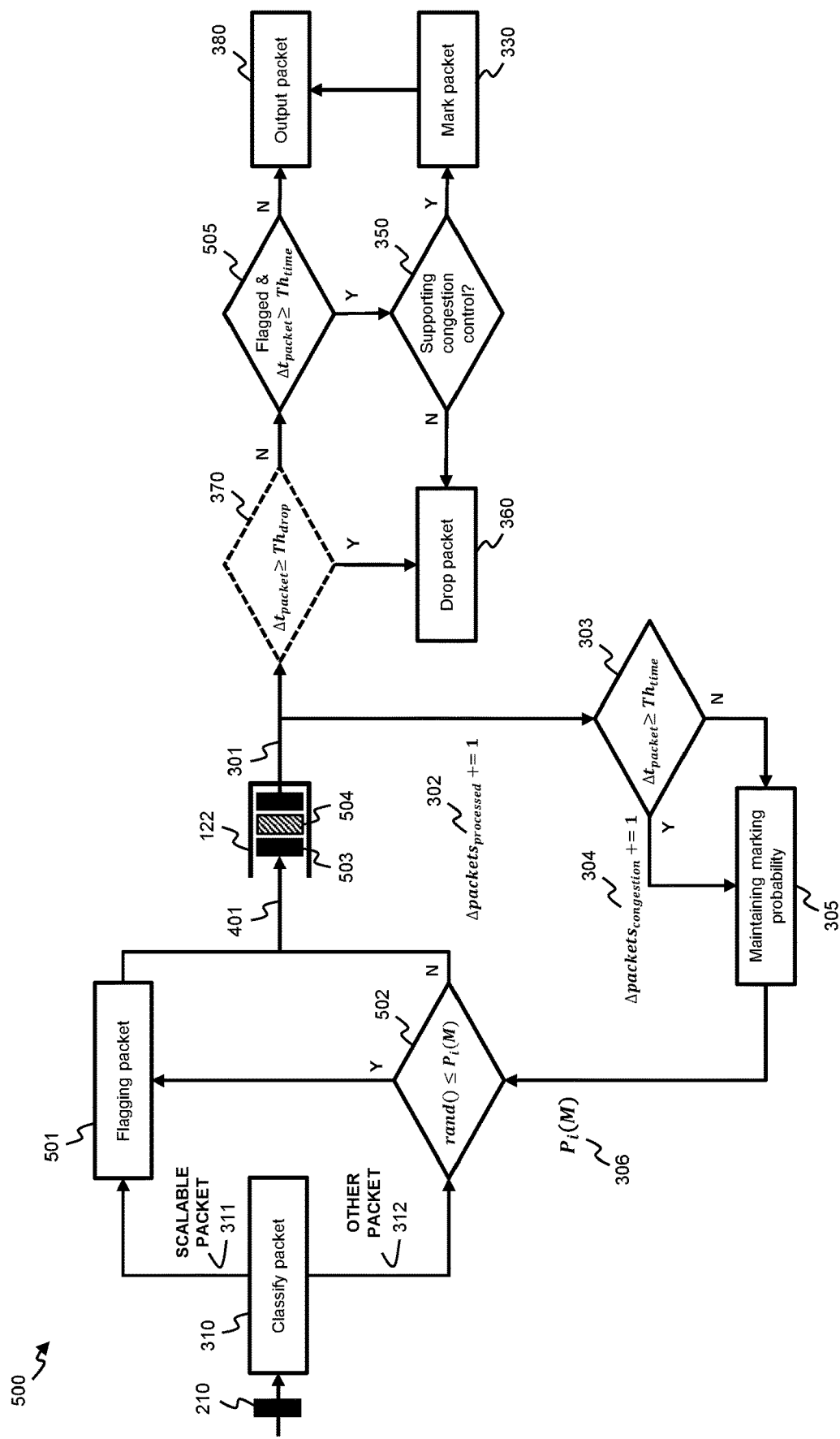
FIG. 5 shows steps of the method for managing data traffic congestion according to example embodiments, wherein a portion of the steps of the method are performed before enqueuing a packet, and a portion of the steps are performed upon dequeuing the packet.

FIG. 5 shows steps 500 according to an example embodiment wherein a portion of the steps of the method are performed before enqueuing 401 a received packet 210, and another portion of the steps are performed upon dequeuing 301 the packet 210.

In a first step 310, a packet 210 received by the network communication node can be classified as a scalable packet 311 or an other packet 312. All scalable packets 311 are flagged for marking in step 501. Other packets 312 are flagged for marking in step 501 according to the maintained marking probability 306, i.e. if the marking probability 306 is larger than or equal to a random value in step 502. Flagging a packet for marking can, for example, include adding an identifier, stamp, or flag to the packet 210. Hereafter, the flagged packets 504 and unflagged packets 503 are enqueued in the network queue 122.

Upon dequeuing 301 the packets 503, 504, the change in total number of packets processed by the network queue $\Delta packets_{processed}$ 302 can be updated, e.g. by incrementing a counter by one. In a following step 303, the dequeued packet can be identified as responsible for congestion. If this is the case, the change in packets responsible for congestion $\Delta packets_{congestion}$ can be updated 304, e.g. by incrementing a counter by one. Else, the method can continue to step 305 without updating $\Delta packets_{congestion}$. In step 305, the marking probability 306 can be maintained or updated as described in relation to FIG. 2 above.

In an optional step 370, the sojourn time $\Delta t_{packet}$ of a packet can further be compared to a first drop threshold $Th_{drop}$. If the sojourn time $\Delta t_{packet}$ of the packet exceeds the first drop threshold $Th_{drop}$, the packet can be dropped in step 360. It will be apparent that optional step 370 need not be performed directly after dequeuing 301, step 370 can for example also be performed after step 505 or step 350.

In a following step 505, the packet can be checked for the presence of the flag in addition to identifying whether the packet is responsible for congestion. If this is not the case, the packet can be outputted or transmitted by the network communication node in step 380. Else, the method proceeds to step 350 wherein it is checked if the packet eligible for marking supports congestion control. If so, the packet can be marked in step 330 and subsequently outputted in step 380. If the packet does not support congestion control, the packet can be dropped in step 360.

This allows to reduce the number of performed operations, the execution time, and the consumed processing power of the method in the dequeue pipeline of a network communication node. This further allows to implement the method in network communication nodes with a high throughput, i.e. bit rate, or low serialization time per packet, i.e. with a limited available time budget in the dequeue pipeline for marking.

It will be apparent that, while steps 303, 370, and 505 in FIG. 5 illustrates a time-based threshold and congestion parameter as in the embodiment illustrated in FIGS. 3A and 3B, a size-based threshold and congestion parameter as illustrated in the embodiments of FIGS. 4A and 4B can also be used.

Figure 6:
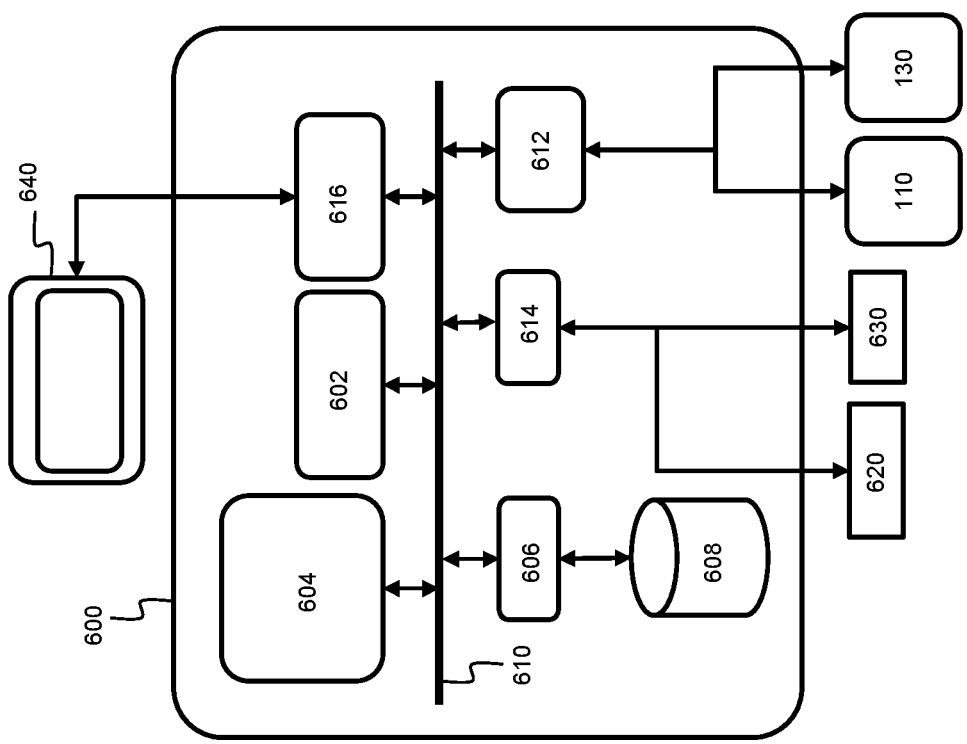
FIG. 6 shows a suitable computing system enabling to implement embodiments of the method for managing data traffic congestion in a network communication node.

FIG. 6 shows a suitable computing system 600 enabling to implement embodiments of the method for managing data traffic congestion in a network communication node. Computing system 600 may in general be formed as a suitable general-purpose computer and comprise a bus 610, a processor 602, a local memory 604, one or more optional input interfaces 614, one or more optional output interfaces 616, a communication interface 612, a storage element interface 606, and one or more storage elements 608. Bus 610 may comprise one or more conductors that permit communication among the components of the computing system 600. Processor 602 may include any type of conventional processor or microprocessor that interprets and executes programming instructions. Local memory 604 may include a random-access memory (RAM) or another type of dynamic storage device that stores information and instructions for execution by processor 602 and/or a read only memory (ROM) or another type of static storage device that stores static information and instructions for use by processor 602. Input interface 614 may comprise one or more conventional mechanisms that permit an operator or user to input information to the computing device 600, such as a keyboard 620, a mouse 630, a pen, voice recognition and/or biometric mechanisms, a camera, etc. Output interface 616 may comprise one or more conventional mechanisms that output information to the operator or user, such as a display 640, etc. Communication interface 612 may comprise any transceiver-like mechanism such as for example one or more Ethernet interfaces that enables computing system 600 to communicate with other devices and/or systems, for example with one or more source nodes, i.e. senders 110 of data packets, and with one or more destination nodes, i.e. receivers 130 of the data packets. The communication interface 612 of computing system 600 may be connected to such a source node or destination node by means of a local area network (LAN) or a wide area network (WAN) such as for example the internet. Storage element interface 606 may comprise a storage interface such as for example a Serial Advanced Technology Attachment (SATA) interface or a Small Computer System Interface (SCSI) for connecting bus 610 to one or more storage elements 608, such as one or more local disks, for example SATA disk drives, and control the reading and writing of data to and/or from these storage elements 608. Although the storage element(s) 608 above is/are described as a local disk, in general any other suitable computer-readable media such as a removable magnetic disk, optical storage media such as a CD or DVD, ROM, disk, solid state drives, flash memory cards, etc. could be used. Computing system 600 could thus correspond to the network communication node 120 as illustrated in FIG. 1.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

As used in this application, the term "circuitry" may refer to one or more or all of the following: (a) hardware-only circuit implementations (such as implementations in only analogue and/or digital circuitry) and (b) combinations of hardware circuits and software, such as (as applicable): (i) a combination of analogue and/or digital hardware circuit(s) with software/firmware and (ii) any portions of hardware processor(s) with software (including digital signal processor(s)), software, and memory(ies) that work together to cause an apparatus to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware.

The invention claimed is:

1. A method of managing data traffic congestion in a network communication node; the method comprising:
    maintaining a marking probability based on a marking ratio indicative of a change in a number of packets processed by a network queue and responsible for congestion in the network queue in the network communication node over a change in a total number of the packets processed by the network queue, wherein those of the packets responsible for congestion are causing a congestion parameter to exceed a threshold;
    classifying packets processed by the network queue as scalable ones of the packets or other of the packets based on an identifier included in the packets, the scalable ones of the packets supporting scalable congestion control;
    marking the scalable ones of the packets responsible for congestion in the network queue with a congestion mark to signal data traffic congestion; and
    marking the other of the packets that support unscalable congestion control with the congestion mark based on the marking probability.

2. A method according to claim 1, wherein the maintaining further comprises identifying those of the packets as responsible for congestion in the network queue before enqueuing the packets in the network queue.

3. A method according to claim 1, wherein the maintaining further comprises identifying those of the packets as responsible for congestion in the network queue upon dequeuing the packets from the network queue.

4. A method according to claim 1, wherein those of the packets are identified as responsible for congestion in the network queue in response to a size of the network queue exceeding a size threshold.

5. A method according to claim 1, wherein those of the packets are identified as responsible for congestion in the network queue in response to a sojourn time of the packets in the network queue exceeding a time threshold.

6. A method according to claim 1, further comprising:
    before enqueuing the packets in the network queue,
        flagging the scalable ones of the packets for marking and flagging the other of the packets for marking based on the marking probability; and
    upon dequeuing, performing the marking with the congestion mark for those of the packets that are flagged for marking and are identified as responsible for congestion in the network queue.

7. A method according to claim 1, further comprising dropping a number of the packets in response to a size of the network queue exceeding a first drop threshold, or in response to a sojourn time of the packets in the network queue exceeding a second drop threshold.

8. A method according to claim 1, further comprising dropping the other of the packets that are eligible for marking based on the marking probability and that do not support unscalable congestion control.

9. A method according to claim 1, wherein the congestion mark and the identifier are included in an explicit congestion notification, ECN, field of an internet protocol, IP, header of the packets.

10. The method of claim 9, wherein the marking further comprises overwriting the identifier included in the explicit congestion notification, ECN, field with the congestion mark.

11. A method according to claim 1, wherein the maintaining of the marking probability comprises updating the marking probability and the marking ratio at a predetermined time interval, or at a predetermined change in the total number of packets processed by the network queue.

12. A method according to claim 1, wherein the marking probability is based on a moving average of the marking ratio.

13. An apparatus, comprising:
    a network communication node to manage data traffic congestion; and wherein the network communication node is configured to:
    maintain a marking probability based on a marking ratio indicative of a change in a number of packets processed by a network queue and responsible for congestion in the network queue in the network communication node over a change in a total number of the packets processed by the network queue, wherein those of the packets responsible for congestion are causing a congestion parameter to exceed a threshold;
    classify the packets processed by the network queue as scalable ones of the packets or other of the packets based on an identifier included in the packets, the scalable ones of the packets supporting scalable congestion control;
    mark the scalable ones of the packets responsible for congestion in the network queue with a congestion mark to signal data traffic congestion; and
    mark the other of the packets that support unscalable congestion control with the congestion mark based on the marking probability.

14. A non-transitory computer readable storage medium comprising computer-executable instructions for performing the following steps when the instructions are executed on a computer:
    maintaining a marking probability based on a marking ratio indicative of a change in a number of packets processed by a network queue and responsible for congestion in the network queue in a network communication node over a change in a total number of the packets processed by the network queue, wherein those of the packets responsible for congestion are causing a congestion parameter to exceed a threshold;

classifying the packets processed by the network queue as scalable ones of the packets or other of the packets based on an identifier included in the packets, the scalable ones of the packets supporting scalable congestion control;
marking the scalable ones of the packets responsible for congestion in the network queue with a congestion mark to signal data traffic congestion; and
marking the other of the packets that support unscalable congestion control with the congestion mark based on the marking probability.

* * * * *